(12) United States Patent
Gonzalez

(10) Patent No.: US 8,759,720 B2
(45) Date of Patent: Jun. 24, 2014

(54) TORTILLA WARMER CONTROL SYSTEM FOR CONTROLLING THE PREPARATION AND DISPENSING OF TORTILLAS

(75) Inventor: Ricardo Gonzalez, Citrus Heights, CA (US)

(73) Assignee: Ricomale, LLC, Modesto, CA (US)

( * ) Notice: Subject to any disclaimer, the term of this patent is extended or adjusted under 35 U.S.C. 154(b) by 498 days.

(21) Appl. No.: 13/019,805

(22) Filed: Feb. 2, 2011

(65) Prior Publication Data

US 2012/0192721 A1 Aug. 2, 2012

(51) Int. Cl.
*A21B 1/22* (2006.01)
*A21B 3/07* (2006.01)
*A47J 36/24* (2006.01)

(52) U.S. Cl.
USPC .............. 219/388; 99/331; 99/338; 99/342

(58) Field of Classification Search
USPC ............. 219/385, 386, 392, 395, 428, 524; 99/377, 379, 391, 393, 448, 331, 386, 99/338, 342
See application file for complete search history.

(56) References Cited

U.S. PATENT DOCUMENTS

| | | | |
|---|---|---|---|
| 2,182,682 A | 12/1939 | Shroyer | |
| 2,864,932 A | 12/1958 | Forrer | |
| 3,740,513 A | 6/1973 | Peters, Jr. et al. | |
| 4,013,869 A | 3/1977 | Orts | |
| 4,015,517 A * | 4/1977 | Pomara, Jr. | 99/355 |
| 4,147,924 A | 4/1979 | DeWitt, Jr. | |
| 4,769,252 A | 9/1988 | Escamilla | |
| 4,782,745 A | 11/1988 | George, Jr. | |
| 4,987,827 A | 1/1991 | Marquez | |
| 5,036,179 A | 7/1991 | Westerberg et al. | |
| 5,123,178 A | 6/1992 | Stein | |
| 5,535,664 A | 7/1996 | Rokowski | |
| 5,584,231 A | 12/1996 | DeLeon | |

(Continued)

FOREIGN PATENT DOCUMENTS

DE 202004001460 U1 5/2004
EP 1252848 A3 1/2004

(Continued)

OTHER PUBLICATIONS

Google Search #1 downloaded on Jul. 16, 2009 http://www.zesco.com/products.cfm?subCatID=2519&PGroupID=040708AZ01.

(Continued)

*Primary Examiner* — Jianying Atkisson
(74) *Attorney, Agent, or Firm* — Russ Weinzimer & Associates P.C.

(57) ABSTRACT

A tortilla warmer control system is disclosed for controlling preparation and dispensing of tortillas. The control system includes a control unit capable of receiving inputs from a user, and providing outputs. The control unit receives user inputs including: a frequency of heating sessions, a number of tortillas to be heated and dispensed during each heating session; and tortilla texture. The control unit provides outputs including: a speed at which tortillas are to be conveyed through a heating sub-system of the tortilla warmer, and/or a temperature to be provided during each heating session; and a heating session initiation signal. The user inputs received by the control unit can also include a selected rate at which the tortillas are to be dispensed during the heating session. The outputs provided by the control unit can also include a rate at which tortillas are introduced into the heating sub-system.

15 Claims, 8 Drawing Sheets

(56) References Cited

U.S. PATENT DOCUMENTS

| | | | |
|---|---|---|---|
| 5,676,051 | A | 10/1997 | Sinemus |
| 5,765,471 | A | 6/1998 | Monard |
| 5,948,301 | A | 9/1999 | Liebermann |
| D436,797 | S | 1/2001 | Huang et al. |
| D442,423 | S | 5/2001 | Monard |
| 6,268,592 | B1 | 7/2001 | Hu et al. |
| 6,373,030 | B1 | 4/2002 | Waldrep |
| 6,838,644 | B1 | 1/2005 | Chung-Ting |
| 7,012,218 | B2 | 3/2006 | Flinn |
| 7,094,991 | B2 | 8/2006 | Naranjo et al. |
| 7,235,762 | B2 | 6/2007 | Gagas et al. |
| 7,495,196 | B2 | 2/2009 | Groll |
| 7,921,767 | B2 * | 4/2011 | Cook et al. ............. 99/328 |
| 2002/0152898 | A1 | 10/2002 | DuBois et al. |
| 2003/0052117 | A1 | 3/2003 | Iniestra Hernandez |
| 2004/0020915 | A1 * | 2/2004 | Shei .................... 219/385 |
| 2005/0006375 | A1 | 1/2005 | Naranjo et al. |
| 2006/0185527 | A1 | 8/2006 | Shei |
| 2006/0289426 | A1 * | 12/2006 | Naranjo et al. ........ 219/385 |
| 2007/0034096 | A1 | 2/2007 | Axinte et al. |
| 2007/0272676 | A1 | 11/2007 | Zougou et al. |
| 2008/0282903 | A1 | 11/2008 | Gonzalez |

FOREIGN PATENT DOCUMENTS

| | | |
|---|---|---|
| EP | 1739358 A1 | 1/2007 |
| WO | 0065970 | 11/2000 |
| WO | 2005034697 A1 | 4/2005 |
| WO | 2006040540 A1 | 4/2006 |

OTHER PUBLICATIONS

Google Search #2 downloaded on Jul. 16, 2009 http://www.zesco.com/products.cfm?subCatID=2519&PGroupID=ZP99092003.

Google Search #3 downloaded on Jul. 16, 2009 http://www.zesco.com/products.cfm?subCatID=1818&PGroupID=050831SS03.

Google Search #4 downloaded on Jul. 16, 2009 http://www.bigtray.com/vollrath-heat-n-serve-food-warmer-72050-sku-vol72050-0-13130.html.

Google Search #5 downloaded on Jul. 16, 2009 http://www.restaurantequipment.com/STAR1HOTDOG.htm.

Google Search #6 downloaded on Jul. 16, 2009 http://cgi.ebay.com.my/Elite-Cuisine-Pizzelle-Maker-Flatbread-Tortilla-Warmer__W0QQcmdZViewItemQQitemZ120388470195.

Google Search #7 downloaded on Jul. 16, 2009 http://www.cooking.com/products/shprodde.asp?SKU=193716.

Google Search #8 downloaded on Jul. 16, 2009 http://www.cooking.com/products/shprodde.asp?SKU=392776.

Google Search #9 downloaded on Jul. 16, 2009 http://www.kitchengadgetry.com/kitchen/gadgets/star-tortilla-grill-tg1-p-6664.html.

* cited by examiner

TORTILLA WARMER CONTROL SYSTEM FOR CONTROLLING THE PREPARATION AND DISPENSING OF TORTILLAS

FIELD

This invention relates generally to food preparation devices, and more particularly to tortilla warmers.

BACKGROUND

Tortillas are a popular food item, usually enjoyed best when they have just been cooked. Uncooked tortillas typically do not provide the same taste appeal as warmed tortillas. Often, tortillas are eaten in combination with other hand-held food. Preparing such meals would require an added step beforehand, in order to warm the tortilla so as to optimize the tortilla's flavor and texture.

Warming devices, including devices designed specifically for warming tortillas, are known in the art. Tortilla warmers are popular for their ability to warm tortillas to an appropriate temperature so as to be properly enjoyed with a meal.

However, the desired texture of tortillas can vary, from meal to meal. Furthermore, depending upon the number of people desiring tortillas, as well as how quickly they eat on average, it can be difficult to warm the appropriate number of tortillas at the appropriate rate, and within the appropriate time interval.

SUMMARY

A tortilla warmer control system for controlling preparation and dispensing of tortillas is disclosed and claimed. The control system includes a control unit capable of receiving inputs from a user, and providing outputs. The control unit receives user inputs including: a frequency of heating sessions, a number of tortillas to be heated and dispensed during each heating session; and tortilla texture. The control unit provides outputs including: a speed at which tortillas are to be conveyed through a heating sub-system of the tortilla warmer, and/or a temperature to be provided during each heating session; and a heating session initiation signal. The user inputs received by the control unit also include a selected rate at which the tortillas are to be dispensed during the heating session. The outputs provided by the control unit also include a rate at which tortillas are introduced into the heating sub-system.

A general aspect of the invention is a tortilla warmer control system for controlling preparation and dispensing of tortillas by a tortilla warmer. The control system includes: a control unit capable of receiving inputs from a user, the inputs including a user-selected frequency of heating sessions, each heating session being a session during which tortillas are to be heated and dispensed, a user-selected quantity of tortillas to be heated and dispensed during each heating session, and a user-selected texture of tortillas to be heated and dispensed during each heating session. The control unit also provides outputs, the outputs including a speed at which tortillas are to be conveyed through a heating sub-system of the tortilla warmer during each heating session and/or a temperature to be provided within the heating sub-system during each heating session, as well as a heating session initiation signal provided at the user-selected frequency of heating sessions. A heating session commences in response to each heating session initiation signal, so as to enable the tortilla warmer to prepare and dispense the user-selected quantity of tortillas per heating session. The heating sessions are performed at the user-selected frequency of heating sessions, each tortilla having the user-selected texture.

In some embodiments, the speed at which tortillas are to be conveyed through the heating sub-system are one of a low speed setting, a medium speed setting, and a high speed setting. In some embodiments, the temperature to be provided within the heating sub-system can be a low temperature setting, a medium temperature setting, or a high temperature setting.

In some embodiments, the inputs further include a user-selected rate at which the user-selected quantity of tortillas are to be heated and dispensed during each heating session. In some embodiments, the outputs further include a rate at which tortillas are to be introduced into the heating sub-system.

In some embodiments, the control unit includes a setting for heating and dispensing as quickly as possible the user-selected quantity of tortillas to be heated and dispensed during each heating session. In some embodiments, a low temperature setting used with a low speed setting produces medium-soft tortillas at a low rate during each heating session.

In some embodiments, a high temperature setting used with a low speed setting produces tostadas at a low rate during each heating session. In some embodiments, a low temperature setting used with a high speed setting produces soft tortillas at a high rate during each heating session. In some embodiments, a high temperature setting used with a high speed setting produces a medium-soft tortillas at a high rate during each heating session.

In some embodiments, the control system further includes a manually operable control panel. In some embodiments, the control panel includes a number pad for entering: the user-selected frequency of heating sessions; the user-selected quantity of tortillas to be heated and dispensed during each heating session; the user-selected rate at which the user-selected quantity of tortillas are to be heated and dispensed during each heating session; and/or the user-selected texture of tortillas to be heated and dispensed during each heating session.

In some embodiments, the control panel includes a texture menu pad for entering the user-selected texture of tortillas to be heated and dispensed. In some embodiments, the control panel includes a button for soft tortilla texture, medium-soft tortilla texture, and/or tostada texture.

In some embodiments, the control panel includes: an "increase" button for increasing the user-selected frequency of heating sessions, the user-selected quantity of tortillas to be heated and dispensed during each heating session, the user-selected rate at which the user-selected quantity of tortillas are to be heated and dispensed during each heating session, and/or the user-selected texture of tortillas to be heated and dispensed during each heating session; and/or a "decrease" button for decreasing the user-selected frequency of heating sessions, the user-selected quantity of tortillas to be heated and dispensed during each heating session, the user-selected rate at which the user-selected quantity of tortillas are to be heated and dispensed during each heating session, and/or the user-selected texture of tortillas to be heated and dispensed during each heating session.

In some embodiments, the manually operable control panel resides on a tortilla warmer housing and/or a remote control that communicates with the tortilla warmer control system via wireless communication. In some embodiments, the control panel is a digital control pad. In some embodiments, the control system further includes a display panel which displays inputs selected by a user. In some embodiments, the digital display resides on a tortilla warmer housing and/or a remote control that communicates with the tortilla warmer control system via wireless communication. In some embodiments, the display panel provides a digital display.

BRIEF DESCRIPTION OF THE DRAWINGS

The invention will be more fully understood by reference to the detailed description, in conjunction with the following figures, wherein.

DETAILED DESCRIPTION

Figure 1:
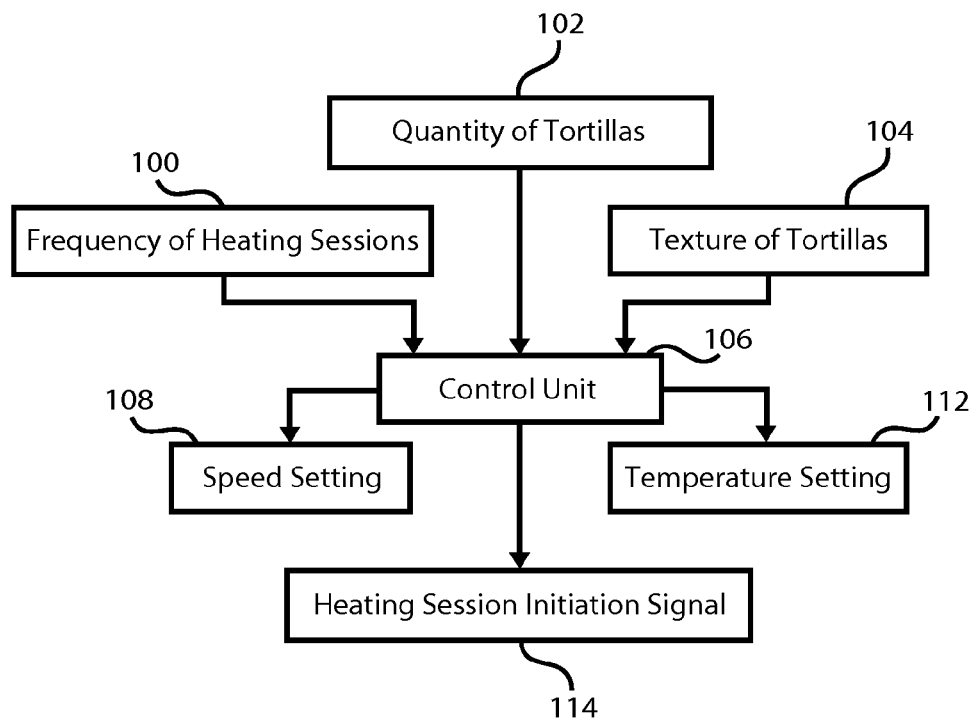
FIG. 1 is a flow diagram illustrating an embodiment of a control unit of the tortilla warmer control system receiving inputs and providing outputs.

FIG. 1 is a flow diagram illustrating an embodiment of a control unit of the tortilla warmer control system receiving inputs and providing outputs. A user of the tortilla warmer inputs: a user-selected frequency of heating sessions 100, each heating session being a session during which tortillas are to be heated and dispensed; a user-selected quantity of tortillas 102 to be heated and dispensed during each heating session; and a user-selected texture of tortillas 104 to be heated and dispensed during each heating session.

The control unit provides outputs including: a speed setting 108, denoting a speed at which tortillas are to be conveyed through a heating sub-system of the tortilla warmer during each heating session, and/or a temperature setting 112, denoting a temperature to be provided within the heating sub-system during each heating session; and a heating session initiation signal 114 provided at the user-selected frequency of heating sessions, a heating session commencing in response to each heating session initiation signal.

Figure 2:
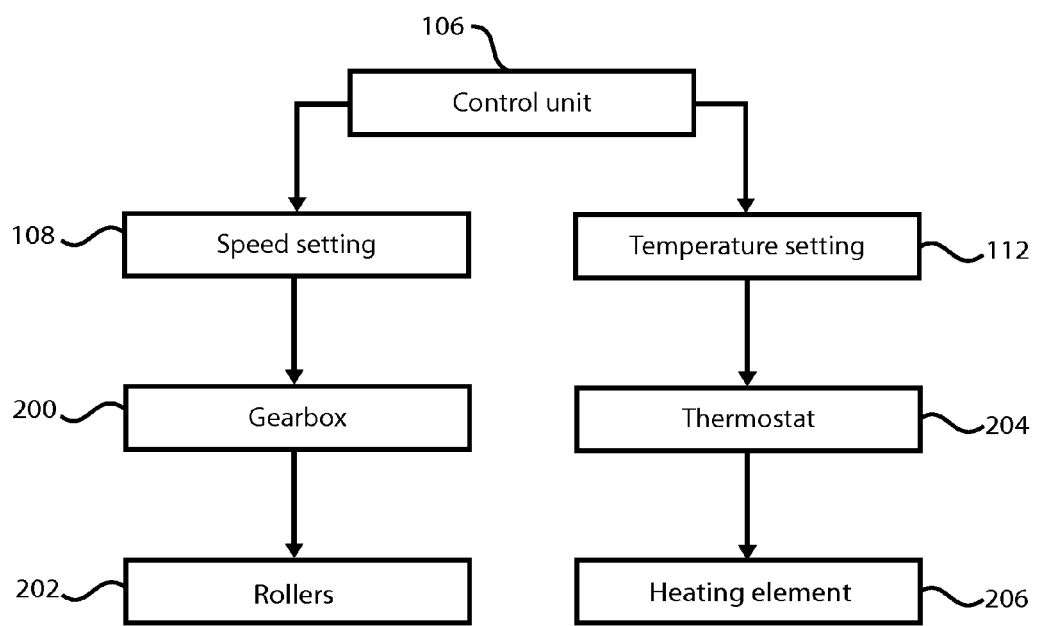
FIG. 2 is a flow diagram illustrating the control unit of FIG. 1 governing elements of a tortilla warmer via outputs including: speed of conveyance of tortillas through a heating sub-system of the tortilla warmer; and temperature of the heating sub-system.

FIG. 2 is a flow diagram illustrating the control unit of FIG. 1 governing elements of a tortilla warmer via outputs including a speed of conveyance of tortillas through a heating sub-system of the tortilla warmer and a temperature of the heating sub-system. A speed setting 108 can govern a gearbox 200 which controls the speed at which the tortilla warmer conveys tortillas through a heating sub-system of the tortilla warmer. The gearbox 200 can control such tortilla conveying elements, such as heated rollers 202, which help convey the tortilla through the heating sub-system.

Furthermore, a temperature setting 204 can govern a thermostat 204 which controls the temperature within the heating sub-system. The thermostat 204 can control heating elements 206 responsible for heating the tortillas, thereby regulating the temperature to which the tortillas are exposed.

Through both speed and temperature regulation, the control unit 206 can enable to the tortilla warmer to prepare and dispense the user-selected quantity of tortillas per heating session, and provide the user-selected texture, in each heating session.

Figure 3:
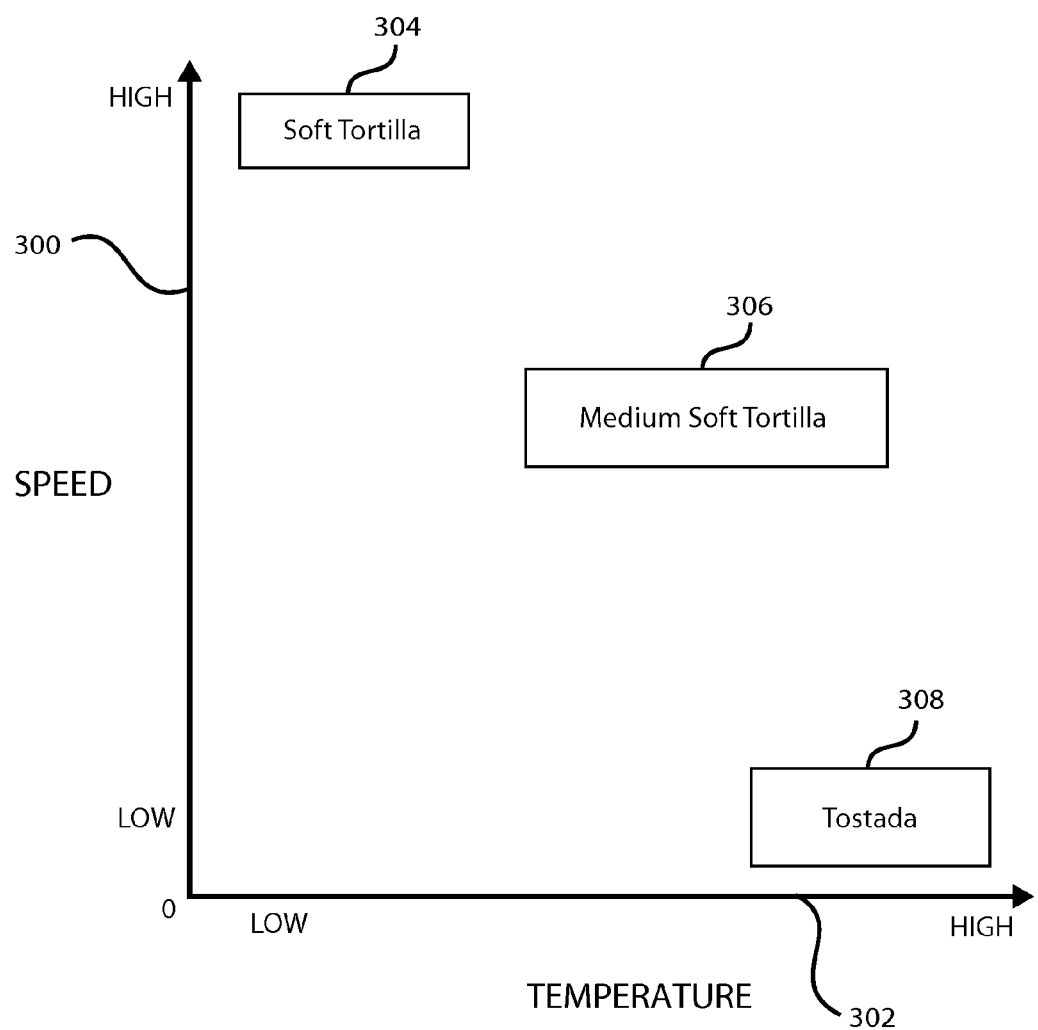
FIG. 3 is a graph showing various possible tortilla textures that can be produced according to levels of conveyance speed and heating sub-system temperature levels.

FIG. 3 is a graph showing various possible tortilla textures that can be produced according to levels of conveyance speed 300 through the heating sub-system, and heating sub-system temperature levels 302, in some embodiments. At a high speed of conveyance through the sub-system, and a low temperature within the heating sub-system, soft tortillas 304 can be produced. At a speed and temperature of medium levels, medium soft tortillas 306 can be produced. At low speed and high temperature, tostadas 308 are produced.

Figure 4:
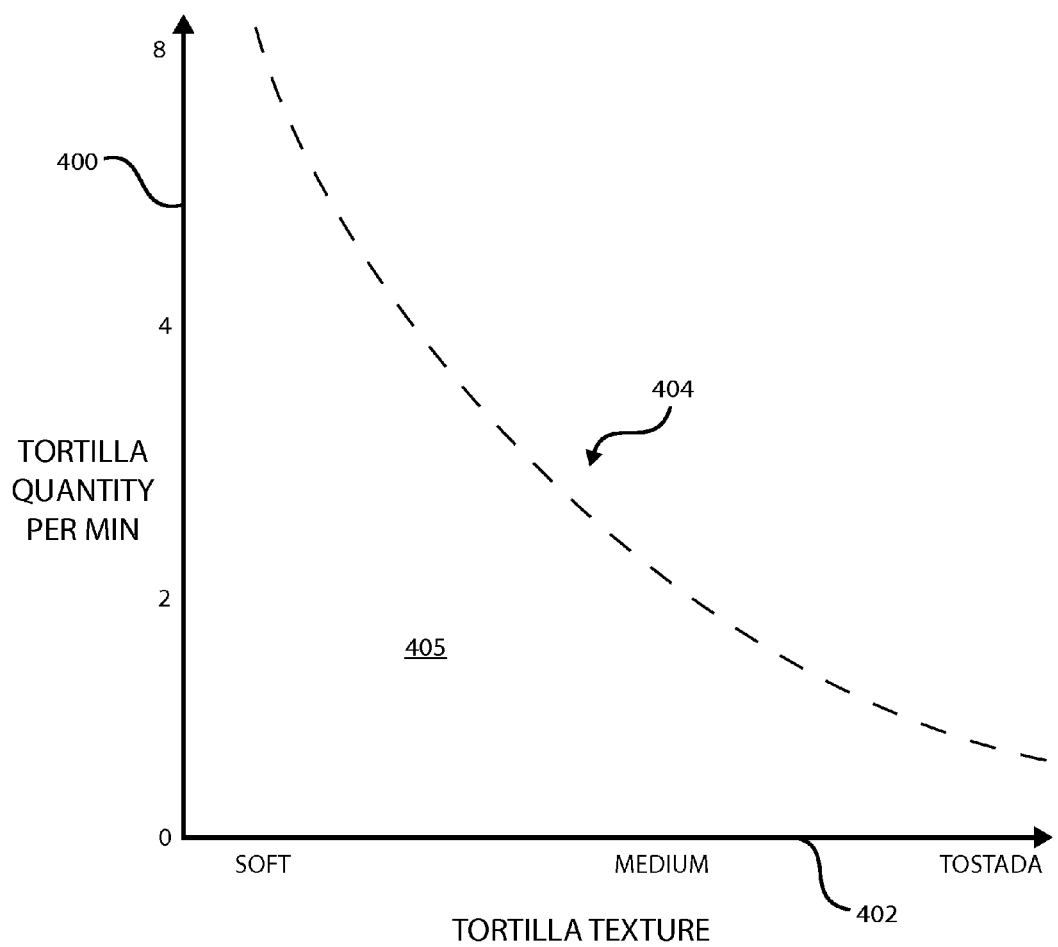
FIG. 4 is a graph showing possible at what speed of conveyance various tortilla textures can be produced, given a constant temperature of the heating sub-system.

FIG. 4 is a graph showing possible at what speed of conveyance various tortilla textures can be produced, given a constant temperature of the heating sub-system. Different rates of tortilla per quantity 400 are possible at a given temperature, depending upon the desired texture 402. Soft tortillas are available at a high rate of tortilla quantity per minute 400, whereas tostadas cannot be produced as quickly at the same temperature. The dotted line curve 404 represents the threshold of the rate of tortilla quantity per minute 400, for a given desired texture 402, above which that particular texture cannot be produced. The area under the curve 405 represents the possible combinations of texture 402 that can be provided at a given rate of tortilla quantity per minute 400.

Figure 5:
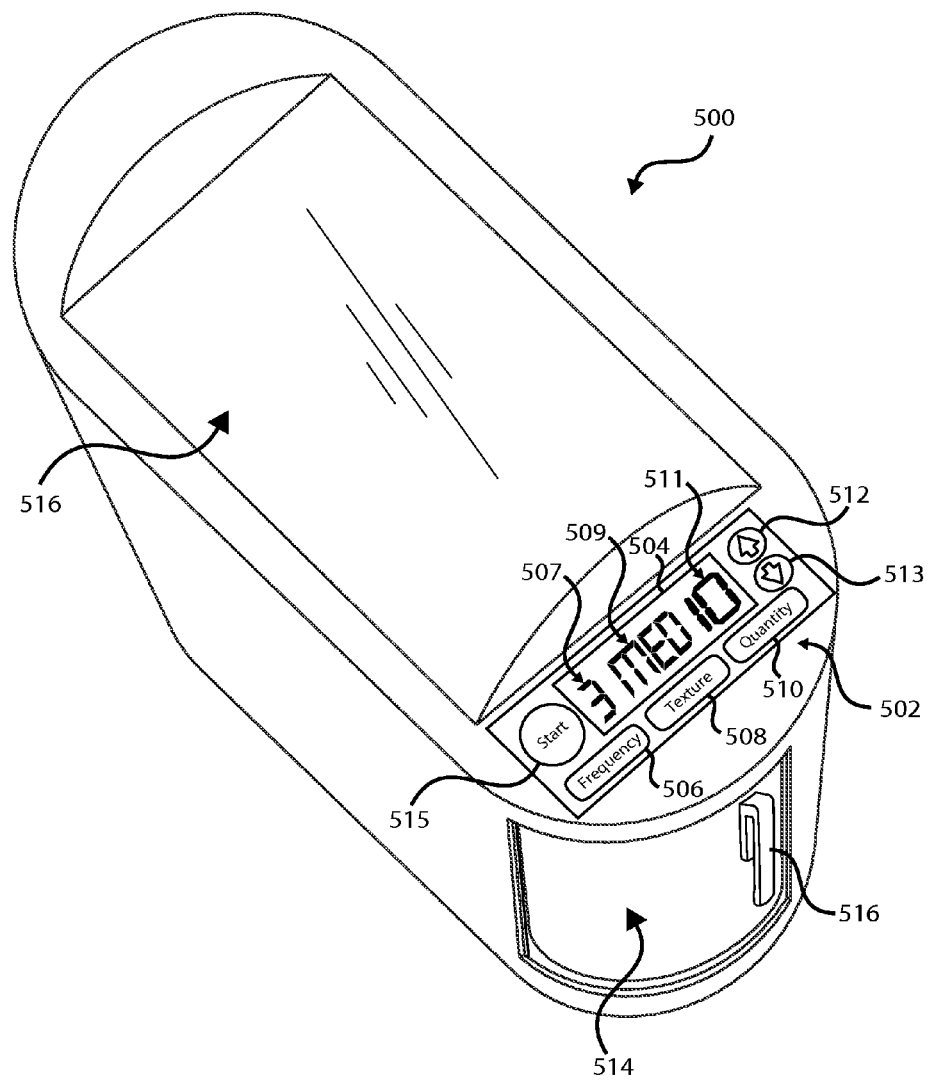
FIG. 5 is an embodiment of a control panel that is operable by a user of the tortilla warming system.

FIG. 5 is an embodiment of a control panel that is operable by a user of the tortilla warming system. A tortilla warmer housing is shown, including a tortilla cartridge 514 which contains tortillas to be conveyed through the heating sub-system of the tortilla warmer, the cartridge 514 to be inserted into the tortilla warmer via a handle 516. A viewer window 516 is shown, through which the conveyance of tortillas through the heating sub-system can be seen. The control panel 502 includes a display window 504 displaying the user-selected inputs of frequency of heating sessions 507, texture of tortillas 509, and quantity of tortillas per heating session 511.

The frequency of heating sessions can be selected according to the time interval between serving and/or consuming one batch of tortillas, and serving and/or consuming the next batch. The quantity of tortillas to be conveyed within a heating session can be related to the number of users eating tortillas at the same time, for example.

In some embodiments, a user can also choose to select the rate at which tortillas are conveyed through the heating sub-system within a given heating session. Such input may be desired to be controlled, for example, if a user needs time to prepare one tortilla before preparing the subsequent tortilla, and/or if multiple users are commencing a meal at different times (such as one minute apart, due to the presence or absence of appetizers, for example).

Buttons for inputting the frequency of heating sessions 506, tortilla texture 508. and quantity of tortillas per heating session 510 are also shown. In addition, an "up" arrow 512 and "down" arrow 513 are also shown, enabling a user to raise or lower a given input value. Finally, a "start" button 515 is provided, for a user to press when they are ready to begin heating the desired of tortillas.

Figure 6:
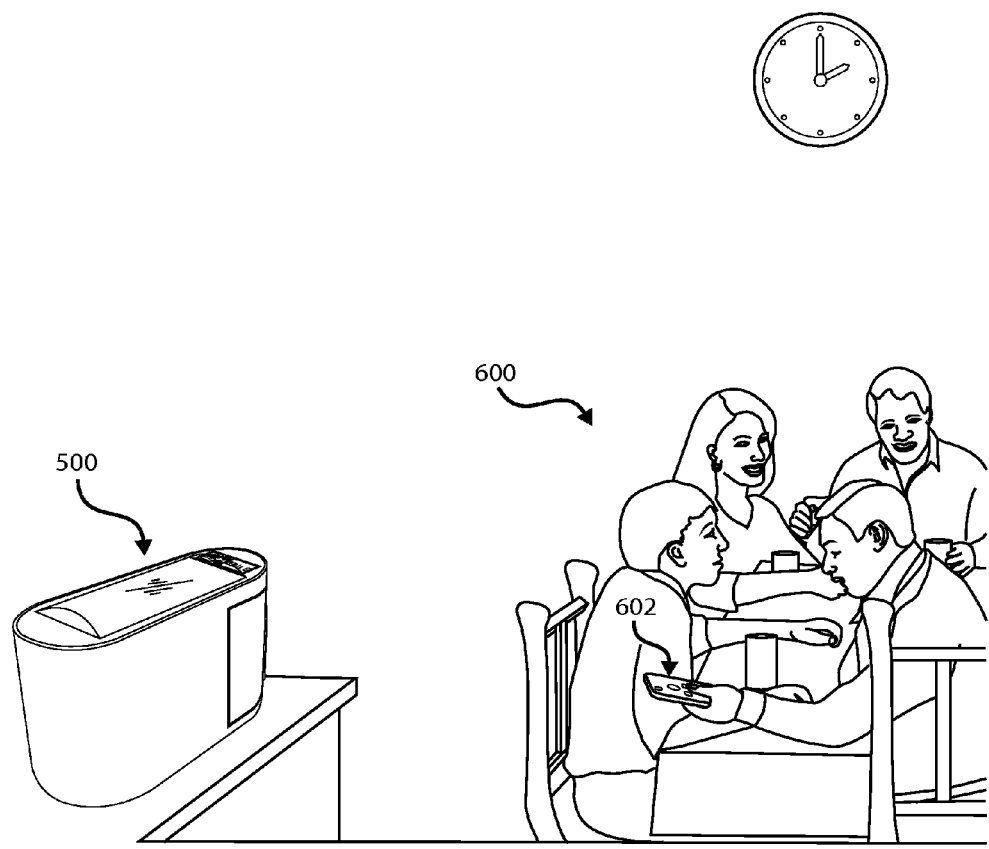
FIG. 6 is an illustration of remote control usage of the invention by a user.

FIG. 6 is an illustration of remote control usage of the invention by a user. As a family 600 sits and begins a meal, a user inputs the frequency of heating sessions, quantity of tortillas per heating session, and tortilla texture, via a remote control 602. The inputs are received by the control unit, which in this embodiment resides in the tortilla warmer housing 500.

Figure 7:
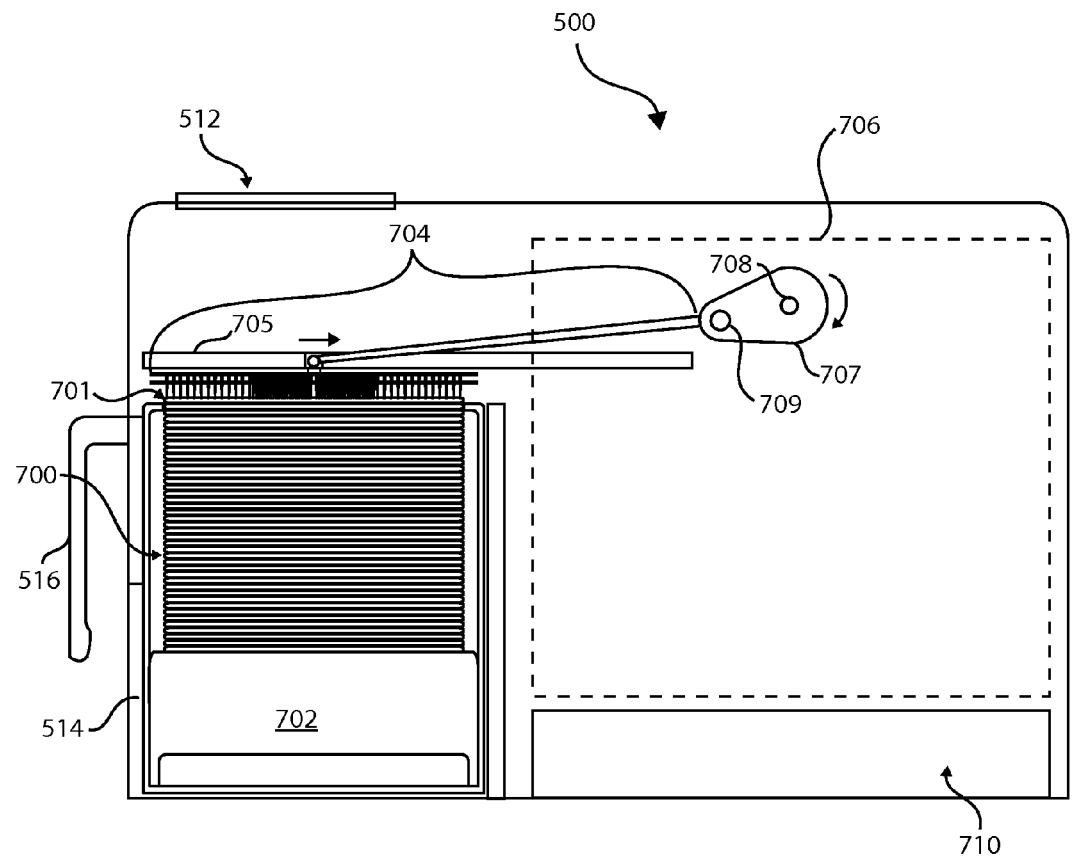
FIG. 7 is a profile view of an exemplary tortilla warming system during conveyance speed and heating temperature control.

FIG. 7 is a profile view of an exemplary tortilla warming system during conveyance speed and heating temperature control. A container 100 is shown holding multiple tortillas 102 in a vertically stacked configuration. The container 514 of the embodiment shown is a tortilla cartridge which can be inserted into the tortilla warmer 500 via a handle 516. A top tortilla 701 is exposed at its top surface. In some embodiments, the container 514 can include an elevator platform 702 for ensuring a top side of the top-most tortilla is always exposed at the top of the container 514, so as to be capable of being taken from the container 514. The elevator platform 702 can be driven by a motor-driven elevator for example, such as an assembly including a motor-driven gear.

Also shown is a dragger 704 capable of at least frictionally engaging the top side of the top tortilla 701, such as maintaining contact between with the top tortilla 701 via static friction, and dragging the top tortilla 701 off the stack of tortillas 700 and out of the top of the container 514. In the embodiment shown, the dragger 704 is constrained to move the top tortilla 701 substantially laterally, the substantial lateral movement being guided by a track 705 to which the dragger is connected.

In the embodiment shown, the dragger 704 is capable of dragging the top tortilla 701 out of the top of the container 514 and into a heating sub-system 706 of the tortilla warmer 500. In the embodiment shown, the dragger 704 is driven by a rotating element 708, which can in turn be driven by another element such as a gear, for example. The rotating element 708 can cause oscillatory lateral movement of the dragger 704. In the embodiment shown, the rotating element 708 rotates about a center point 708, and a free hinge joint 709 connecting the rotating element 708 and the dragger 704 traces a circular path as the rotating element 708 rotates.

A control panel 512 can communicate inputs to the control unit, which in turn provides a speed setting governing a gearbox 710 which controls the speed at which the rotating element 708 drives the dragger 704, for example. The control unit also provides a temperature setting governing a thermostat which controls the temperature within the heating sub-system 706 of the tortilla warmer.

Figure 8:
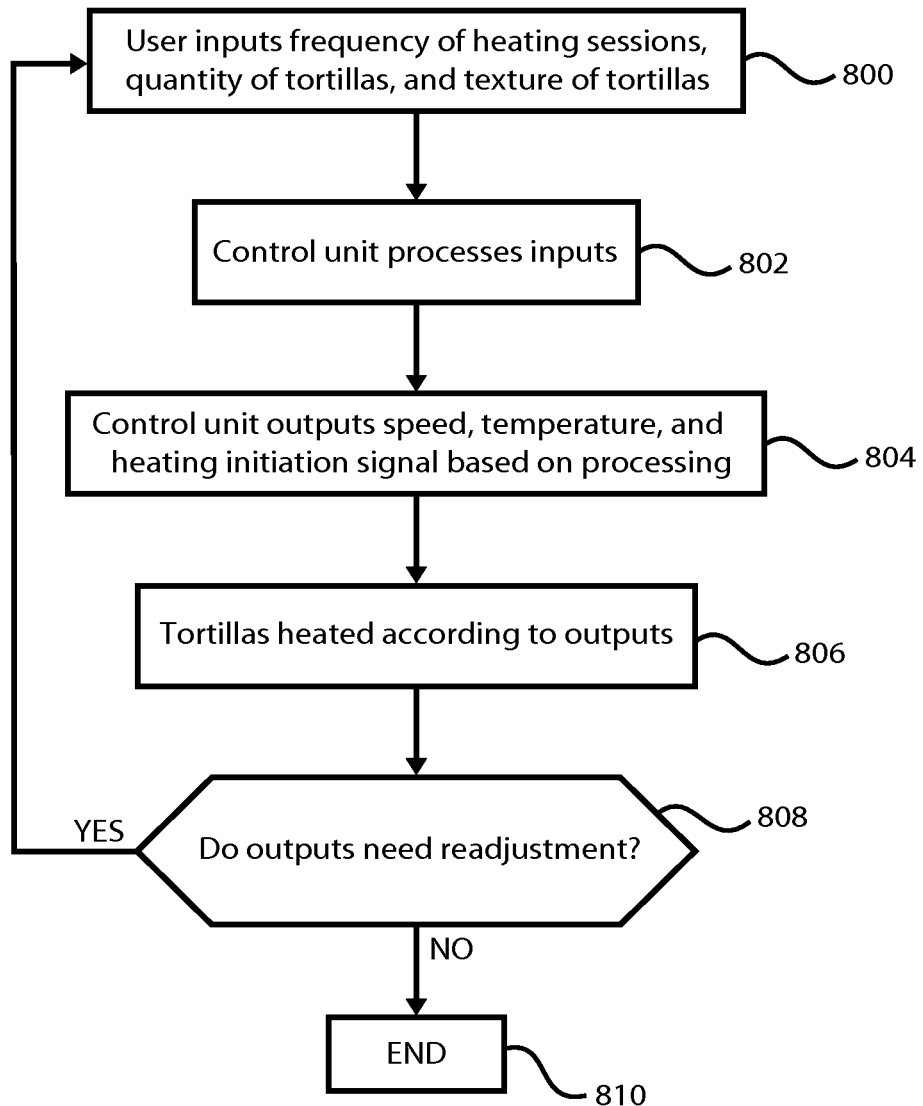
FIG. 8 is a flow chart illustration operation of a tortilla warmer equipped with an embodiment of the tortilla warmer control system.

FIG. 8 is a flow chart illustration operation of a tortilla warmer equipped with an embodiment of the tortilla warmer control system. First, a user inputs the frequency of heating sessions, the quantity of tortillas, and texture of tortillas 800. Next, the control unit processes the inputs 802. Next, the control unit outputs a speed setting, temperature setting, and heating initiation signal, based on the processing 804. The user-selected quantity of tortillas are then heated according to the outputs. If the outputs need readjustment 808, then the user inputs the new inputs 800 and the steps are traversed once again according to the new inputs.

Other modifications and implementations will occur to those skilled in the art without departing from the spirit and the scope of the invention as claimed. Accordingly, the above description is not intended to limit the invention except as indicated in the following claims.

What is claimed is:

1. A tortilla warmer control system for controlling preparation and dispensing of tortillas by a tortilla warmer, the tortilla warmer having a heating sub-system and a tortilla conveyance sub-system, the control system comprising:

a control unit configured to:
  receive inputs from a user, the inputs for specifying:
    a frequency of heating sessions, each heating session defined by a period of time during which tortillas are to be heated and dispensed,
    a quantity of tortillas to be heated and dispensed during each heating session; and
    a texture of tortillas to be heated and dispensed during each heating session,
  provide output signals by which to control
    the tortilla warmer, the output signals including:
    a speed signal, in communication with the conveyance sub-system, to control the speed at which tortillas are to be conveyed through the heating sub-system during each heating session as a function of the user-specified texture; and
    a temperature signal, in communication with the heating subsystem, to control the temperature within the heating sub-system during each heating session as a function of the user-specified texture; and
    a heating session initiation signal configured to activate the conveyance sub-system and the heating sub-system at the beginning of each heating session, the heating session initiation signal being generated at a rate defined by the user-specified frequency of heating sessions,
  whereby the user-specified total number of tortillas can be heated and dispensed, each processed to have the user-specified texture, for each completed heating session.

2. The tortilla warmer control system of claim 1, wherein the speed signal is configured to control the conveyance sub-system to convey the tortillas through the heating sub-system at a low speed setting; a high speed setting; and a medium speed setting that falls between the low and high speed settings.

3. The tortilla warmer control system of claim 2, wherein the temperature signal is configured to control the temperature within the heating sub-system to achieve: a low temperature setting; a high temperature setting; and a medium temperature setting that falls between the low and high temperature settings.

4. The tortilla warmer control system of claim 1, wherein the speed signal is configured to control the conveyance sub-system to convey the tortillas through the heating sub-system at any speed falling between a slowest and a fastest speed.

5. The tortilla warmer control system of claim 2, wherein the speed signal is further configured to control a rate at which tortillas are to be introduced into the heating sub-system from a container of the conveyance subsystem.

6. The tortilla warmer control system of claim 1, wherein the wherein the speed signal is configured to control the amount of time each tortilla spends in the heating subsystem before being dispensed.

7. The tortilla warmer control system of claim 1, wherein the user input that specifies texture can be used to select medium-soft tortillas, thereby causing the control system to select the low temperature setting using the temperature signal, and the low speed setting using the speed signal to produces medium-soft tortillas during each heating session.

8. The tortilla warmer control system of claim 1, wherein the user input that specifies texture can be used to select tostadas, thereby causing the control system to select the high temperature setting using the temperature signal, and the low speed setting using the speed signal to produce tostadas during each heating session.

9. The tortilla warmer control system of claim 1, wherein the user input that specifies texture can be used to select soft tortillas, thereby causing the control system to select the low temperature setting using the temperature signal, and the high speed setting using the speed signal to produces soft tortillas during each heating session.

10. The tortilla warmer control system of claim 1, wherein the user input that specifies texture can be used to select medium-soft tortillas, thereby causing the control system to select the high temperature setting using the temperature signal, and the high speed setting using the speed signal to produces a medium-soft tortillas during each heating session.

11. The tortilla warmer control system of claim 1, further comprising a manually operable control panel that includes a texture menu pad for entering the user-selected texture of tortillas to be heated and dispensed during each heating session.

12. The tortilla warmer control system of claim 11, wherein the control panel further includes a number pad for entering user inputs specifying the frequency of heating sessions; and the quantity of tortillas to be heated and dispensed during each heating session.

13. The tortilla warmer control system of claim 11, wherein the texture menu pad of the control panel includes an input for specifying a soft tortilla texture; a medium-soft tortilla texture; and a tostada texture.

14. The tortilla warmer control system of claim 5, wherein:
the container of the conveyance sub-system contains a capacity of tortillas; and
the heating sessions are capable of continuing at the user-specified rate until the capacity of the container has been exhausted.

15. The tortilla warmer control system of claim 14, wherein:
the conveyance sub-system further includes:
an elevator system for making a top tortilla available for removal from the container; and
a dragger for removing the top tortilla from the container and introducing the top tortilla to the heating sub-system, and
the speed signal is configured to:
control the rate at which the elevator system elevates the tortillas to the top of the container during a heating session, and
control the movement of the dragger to remove the top tortilla and introduce it into the heating subsystem at substantially the same rate as each tortilla is elevated to the top of the container during a heating session.

* * * * *